(12) United States Patent
Kamiya et al.

(10) Patent No.: US 9,640,791 B2
(45) Date of Patent: May 2, 2017

(54) BATTERY AND BATTERY MODULE

(75) Inventors: Masato Kamiya, Anjo (JP); Taira Saito, Miyoshi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 273 days.

(21) Appl. No.: 14/373,392

(22) PCT Filed: Jan. 23, 2012

(86) PCT No.: PCT/JP2012/051347
§ 371 (c)(1),
(2), (4) Date: Jul. 21, 2014

(87) PCT Pub. No.: WO2013/111264
PCT Pub. Date: Aug. 1, 2013

(65) Prior Publication Data
US 2015/0295219 A1 Oct. 15, 2015

(51) Int. Cl.
*H01M 2/00* (2006.01)
*H01M 2/30* (2006.01)
*H01M 2/06* (2006.01)
*H01M 2/20* (2006.01)

(52) U.S. Cl.
CPC .............. *H01M 2/30* (2013.01); *H01M 2/06* (2013.01); *H01M 2/204* (2013.01); *H01M 2/206* (2013.01)

(58) Field of Classification Search
CPC ...................................... H01M 4/02
See application file for complete search history.

(56) References Cited

U.S. PATENT DOCUMENTS

| 6,982,131 B1 | 1/2006 | Hamada et al. |
| 2010/0047686 A1* | 2/2010 | Tsuchiya ............... H01M 2/202 429/178 |
| 2011/0092111 A1 | 4/2011 | Tsuchiya et al. |

FOREIGN PATENT DOCUMENTS

| CN | 1292573 A | 4/2001 |
| CN | 102057520 A | 5/2011 |
| JP | 6-251762 | 9/1994 |
| JP | 2009-301874 | 12/2009 |

* cited by examiner

*Primary Examiner* — Jacob Marks
(74) *Attorney, Agent, or Firm* — Finnegan, Henderson, Farabow, Garrett & Dunner, LLP

(57) ABSTRACT

A battery includes: an external terminal protruding outward from a main body; a metal terminal for taking out electric power from inside the main body to the external terminal; and an insulating member for insulation between the main body, and the external terminal and the metal terminal. The metal terminal includes a base portion connected to the inside of the main body and extending along the same plane as one face of the main body from which the external terminal protrudes and an end portion which further extends from the base portion and to which the external terminal is fixed. The external terminal includes a tip end face formed as a sloping face which is low on the end portion side of the metal terminal and high on the base portion side of the metal terminal.

5 Claims, 5 Drawing Sheets

BATTERY AND BATTERY MODULE

CROSS-REFERENCE TO RELATED APPLICATIONS

This application is a national phase application of International Application No. PCT/JP2012/051347, filed Jan. 23, 2012, the content of which is incorporated herein by reference.

TECHNICAL FIELD

The present invention relates to a battery including an external terminal protruding outward from a main body.

BACKGROUND ART

Patent Document 1 discloses an electrode including a metal terminal having a base portion fixed to a main body of a battery via an insulating body and an end portion extending from the base portion and disposed at a predetermined distance from the main body, and an external terminal protruding outside the main body from the end portion. Patent Document 1 discloses a structure of a battery module formed by connecting the external terminals of adjacent battery cells with a bus bar.

CITATION LIST

Patent Literature

Patent Document 1: JP 2009-301874 A

SUMMARY OF INVENTION

Technical Problem

If an impact is applied to the external terminal from outside when the battery drops or during use of the battery, the external terminal falls to come in contact with the battery main body, which may cause a short circuit between the external terminal and the main body. In the conventional battery, the external terminal falls over in random directions and therefore it is difficult to avoid this problem.

In this manner, there is no conventional battery adopting sufficient measures against the problem which may be caused when a load or an impact is applied to the external terminal.

The present invention aims to provide a technique capable of avoiding contact between an external terminal and a battery main body when a load or an impact is applied to the external terminal from outside (along a protruding direction) during use of a battery, when the battery drops, or the like.

Technical Solutions

A first aspect of the present invention relates to a battery including: an external terminal protruding outward from a main body; a metal terminal for taking out electric power from an inside of the main body to the external terminal; and an insulating member for insulation between the main body, and the external terminal and the metal terminal. The metal terminal includes: a base portion connected to the inside of the main body and extending along a same plane as one face of the main body from which the external terminal protrudes; and an end portion further extending from the base portion and to which the external terminal is fixed. The external terminal includes a tip end face formed as a sloping face where the side of the end portion of the metal terminal is low and the side of the base portion of the metal terminal is high.

In a preferable embodiment, the external terminal has a notch at a midpoint in a protruding direction of the external terminal.

A slope angle of the tip end face of the external terminal is preferably set in a range of 10° to 70°.

A second aspect of the invention relates to a battery module configured by connecting a plurality of batteries according to the first aspect of the invention. The external terminals of the adjacent batteries are connected by a bus bar.

In the battery module, the notches are preferably formed above portions connected to the bus bar.

Advantageous Effects of Invention

According to the invention, it is possible to control a falling direction of the external terminal when a load or an impact is applied to the external terminal from outside (along a protruding direction), and therefore the contact between the external terminal and the battery main body can be prevented.

DESCRIPTION OF EMBODIMENTS

Battery

Figure 1:
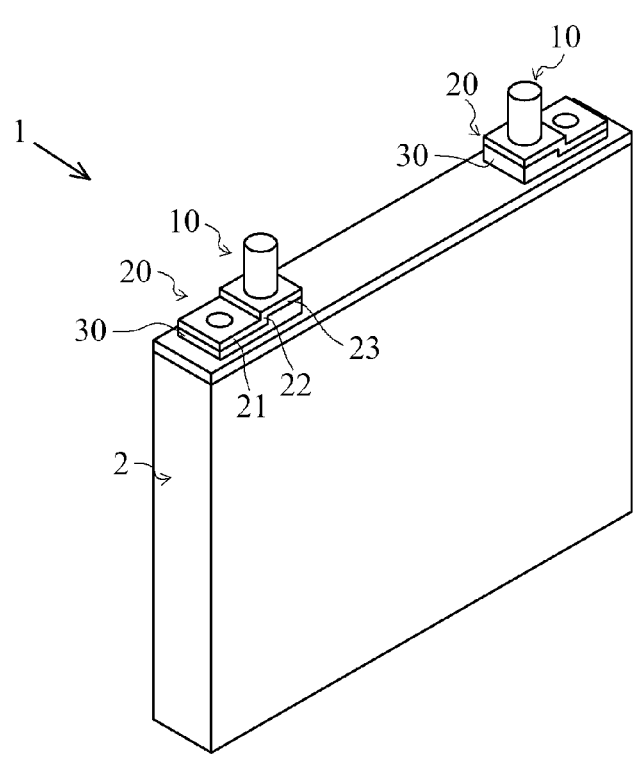
FIG. 1 is a diagram showing a battery.

As shown in FIG. 1, a battery 1 includes a main body 2, external terminals 10 protruding outward from the main body 2 and metal terminals 20 for connecting the external terminals 10 and an inside of the main body 2.

The main body 2 is formed as a metal prismatic can and houses therein a charge-discharge element, electrolyte solution, and the like. Each of the metal terminals 20 is connected to the inside of the main body 2 via a collector terminal connected to the charge-discharge element. Between the main body 2, and the external terminal 10 and the metal terminal 20, an insulating member 30 is disposed for insulating among them.

The external terminal 10 is provided to protrude outward from one face (upper face) of the prismatic main body 2 with the insulating member 30 interposed therebetween. In the embodiment, the external terminal 10 extends in a vertical direction from the upper face of the main body 2. The external terminals 10 are respectively fixed to the metal terminals 20.

Each of the external terminals 10 is used for connection of the battery 1 to an external device. For example, a bolt having an external thread formed on its outer periphery can be employed as the external terminal 10. In this case, a connecting terminal of the external device, a bus bar, or the like can be fitted over the external thread and easily fastened to it by using a nut or the like.

The metal terminal 20 is an electric path for taking out electric power from inside the main body 2 to the external terminal 10. The metal terminal 20 is formed as a plate-shaped member extending along the upper face of the main body 2, and includes a base portion connected to the inside of the main body and an end portion further extending from the base portion. The metal terminal 20 is connected, at the base portion, to the collector terminal extending from the inside of the main body 2 and is connected at the end portion to the external terminal 10. Each of the metal terminals 20 is fixed to the main body 2 with the insulating member 30 interposed therebetween.

In the embodiment, the metal terminal 20 extends in a long-side direction of the upper face (the face from which the external terminal 10 protrudes) of the main body 2 and is formed in a shape of a flat plate bent into a crank shape by the base portion 21 connected to the inside of the main body 2 with the insulating member 30 interposed therebetween, a connecting portion 22 extending from the base portion 21 in a direction away from the main body 2 (upward), and the end portion 23 extending from the connecting portion 22 in the same direction as the base portion. In other words, the metal terminal 20 is formed in a substantially Z shape in a side view by the base portion 21, the connecting portion 22, and the end portion 23.

In this manner, the external terminal 10 is electrically connected to the charge-discharge element housed in the main body 2 with the metal terminal 20 interposed therebetween. The external terminal 10 and the metal terminal 20 are electrically insulated from the main body 2 and retained at a physical distance from the main body 2 by the insulating member 30.

In the metal terminal 20, a side on which the electric power is taken out from inside the main body 2 and a side on which the external terminal 10 protrudes are displaced from each other on the upper face of the main body 2. Therefore, no member is disposed on the opposite side from the side on which the external terminal 10 is disposed, i.e., on the outer side of the base portion 21 of the metal terminal 20 and this side is exposed to the outside.

Tip End Face of External Terminal

Figure 2:
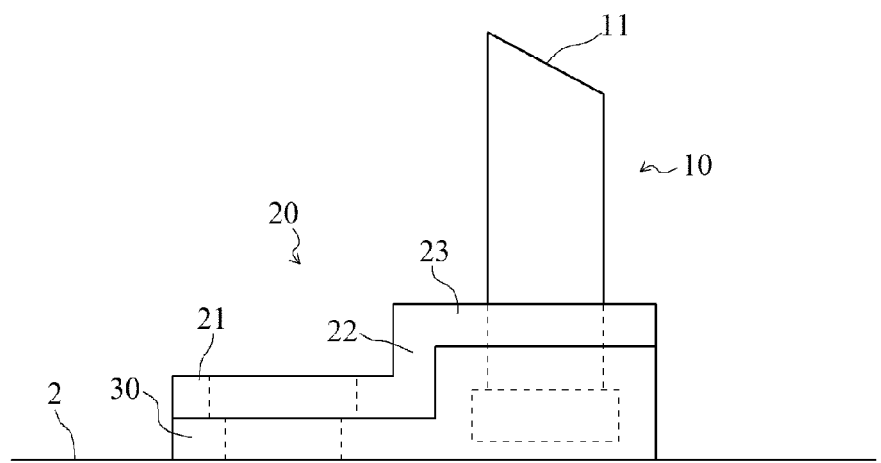
FIG. 2 is an enlarged view of a tip end face of an external terminal.

As shown in FIG. 2, the external terminal 10 has a tip end face 11 formed as a sloping face.

The tip end face 11 slopes upward from the end portion 23 side toward the base portion 21 side in the metal terminal 20. In other words, the tip end face 11 slopes in such a manner that it is high on a side of the upper face of the main body 2 on which the base portion 21 of the metal terminal 20 insulated from the main body 2 exists and the tip end face 11 slopes upward from the protruding side of the external terminal 10 toward the side on which the electric power is taken out from inside the main body 2.

Figure 3:
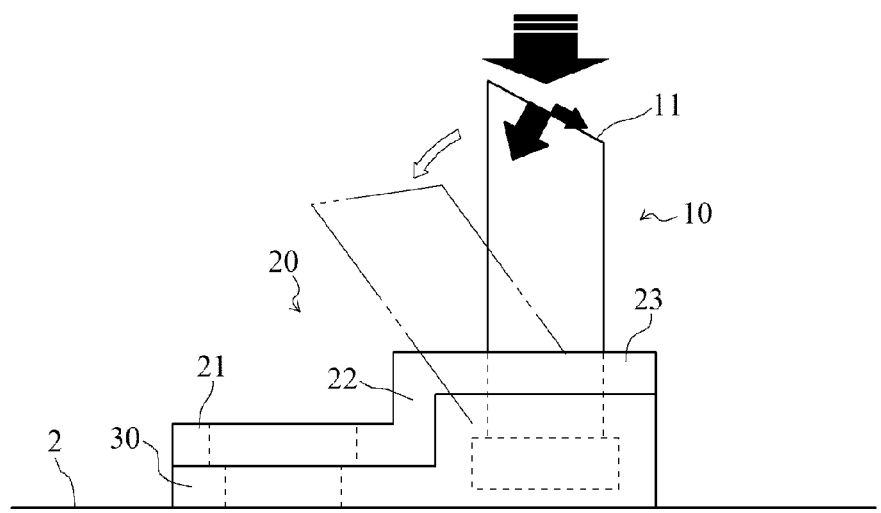
FIG. 3 is a diagram showing a force applied to the external terminal.

As shown in FIG. 3, when a force from outside (from above) is applied to the external terminal 10, a direction of the force applied to the external terminal 10 is determined according to an angle of a slope of the tip end face 11. In other words, by forming the tip end face 11 as the sloping face, the load or impact applied from above to the external terminal 10 can be directed into a lateral direction and it is possible to control a falling direction into a desired direction.

The metal terminal 20 (the base portion 21 of the metal terminal 20) exists in the falling direction of the external terminal 20) and the external terminal 10 falls over the metal terminal 20 when the external terminal 10 is deformed. Because the metal terminal 20 is insulated from the main body 2, the external terminal 10 and the main body 2 do not come in contact with each other and the short circuit does not occur, even when the external force is applied to the external terminal 10 and the external terminal 10 falls over.

As described above, forming the tip end face 11 of the external terminal 10 as the sloping face makes it possible to control the falling direction. Setting the sloping direction of the tip end face 11 so that the external terminal 10 is inclined toward the side on which a part of the metal terminal 20 insulated from the main body 2 exists, it is possible to restrict a deformation direction of the external terminal 10 when the external force is applied to the tip end face 11 of the external terminal 10 to the side insulated from the main body 2.

Notch in External Terminal

Figure 4:
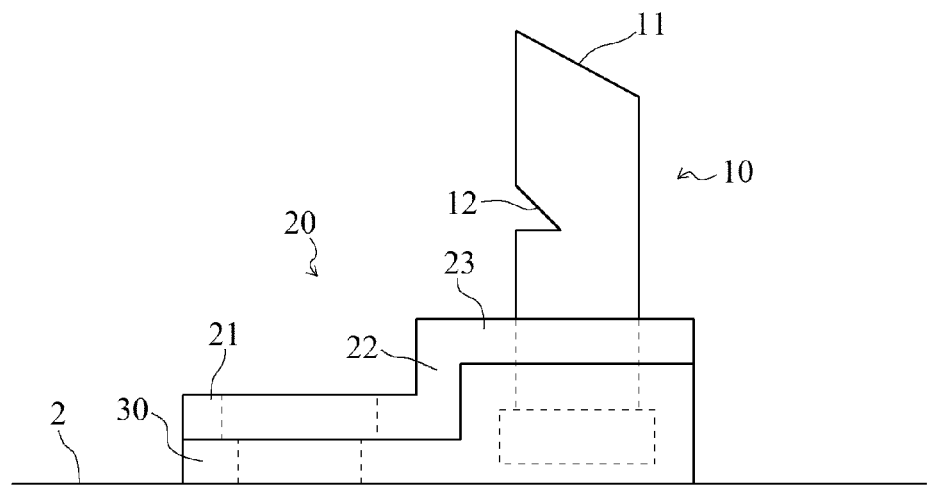
FIG. 4 is a diagram showing a notch in the external terminal.

As shown in FIG. 4, a notch 12 is formed at a midpoint in the protruding direction of the external terminal 10. The notch 12 is obtained by filing the outer periphery of the external terminal 10, for example.

The notch 12 is formed from the outer peripheral face of the external terminal 10 toward a center side of the external terminal 10. The notch 12 is provided on a side of the external terminal 10 on which the electric power is taken out from inside the main body 2. In other words, the notch 12 is provided on the base portion 21 side of the metal terminal 20 and on the side which is set to be the falling direction of the external terminal 10 by the slope of the tip end face 11.

Providing the notch 12 on the one side of the external terminal 10, the external force directed into the predetermined direction is likely to be applied to the external terminal 10 when the external force is applied to the external terminal 10.

Figure 5:
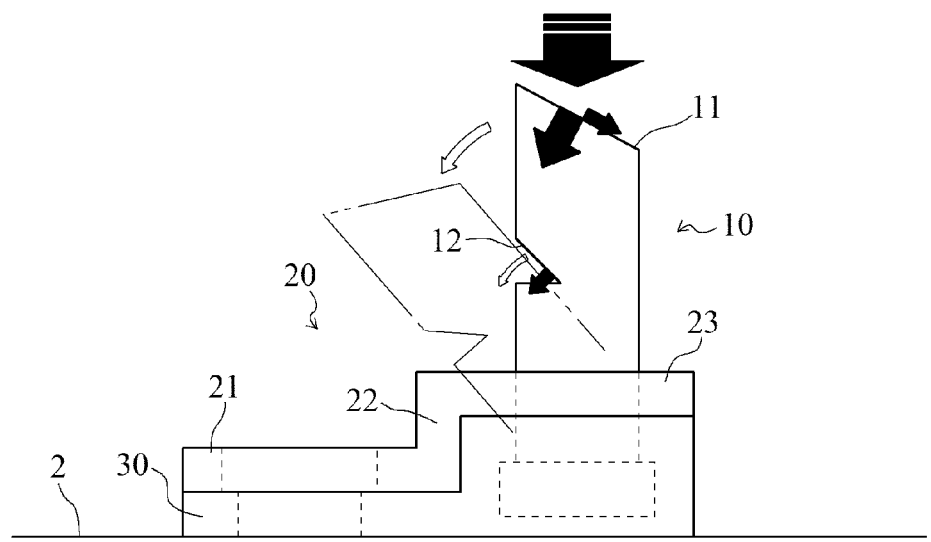
FIG. 5 is a diagram showing a force applied to the notch in the external terminal.

As shown in FIG. 5, when the external force is applied to the tip end face 11 of the external terminal 10, stress concentrates on the notch 12 and the external terminal 10 is likely to be deformed first at a periphery of the notch 12, which facilitates deformation of the external terminal 10. Forming the notch 12 on the base portion 21 side of the metal terminal 20, it is possible to restrict the deformed direction of the external terminal 10 to the side insulated from the main body 2. Even if the external terminal 10 falls over, it is possible to prevent contact between the external terminal 10 and the main body 2.

The depth (or a radial length from the outer face) of the notch 12 is set to such a depth that the external terminal 10 can perform its function. In other words, the depth of the notch 12 is set to such a depth that the external terminal 10 has sufficient strength during use of the battery 1. For example, the notch 12 is preferably formed from a surface of the outer periphery of the external terminal 10 toward the central portion to have a depth substantially equal to half an outside diameter.

The notch 12 is formed as a brittle portion provided to a part of the outer periphery of the external terminal 10 and affects deformation mode of the external terminal 10. As a replacement for the notch 12, a part of the outer periphery of the external terminal 10 may be formed into a brittle portion by using material with low strength.

Battery Module

Figure 6:
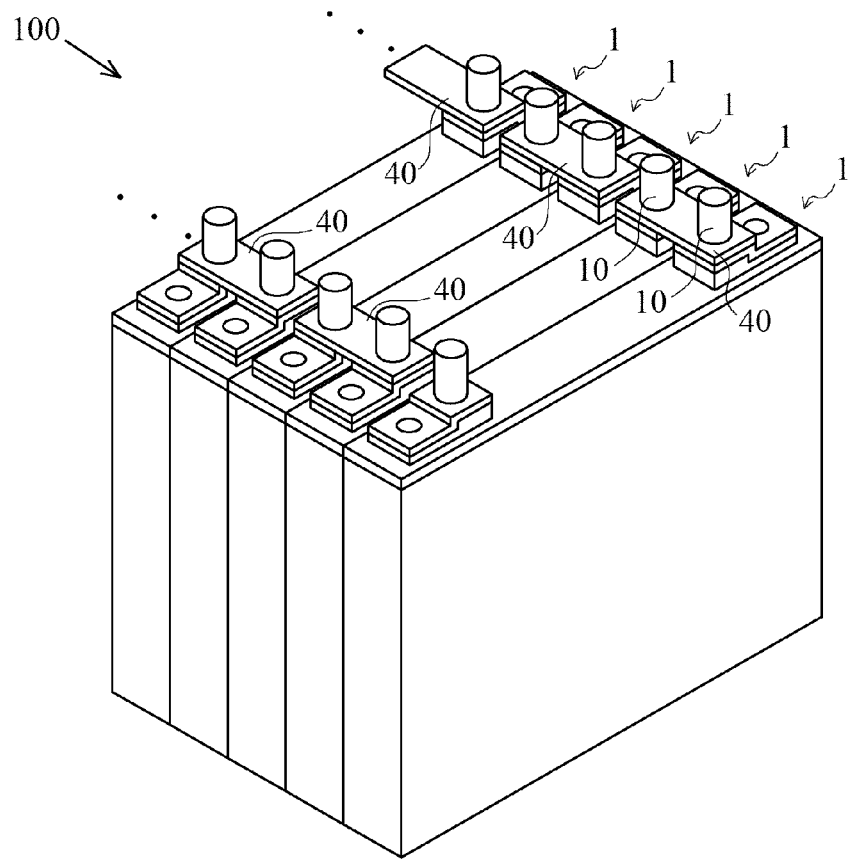
FIG. 6 is a diagram showing a battery module.

As shown in FIG. 6, the battery is also used in a state of a battery module formed by connecting the plurality of batteries 1 in series or parallel. In this case, the batteries 1 are formed as the battery module by arranging the batteries 1 in a narrow width direction of the main body 2 and fastening the external terminals 10 of the adjacent batteries 1 with bus bars 40. The bus bars 40 are flat plate members made of metal and serve as electric paths for connecting the external terminals 10. In other words, the batteries 1 are electrically connected by the bus bars 40.

In the battery module, the adjacent batteries 1 are connected by the bus bar 40. In this case, because the bus bar 40 is insulated from the main body 2, the falling direction of the external terminal 10 may be toward the bus bar 40 as well as toward the base portion 21 of the metal terminal 20. In other words, if the battery 1 is used for the battery module, the sloping direction of the tip end face 11 of the external terminal 10 and disposition of the notch 12 may be set so that the external terminal 10 falls toward the bus bar 40 side connecting the external terminals 10 of the adjacent batteries 1.

If the batteries 1 are connected by the bus bar 40, the notch 12 of each of the external terminals 10 is preferably provided above a portion to which the bus bar 40 is connected.

Crush Test

Figure 7:
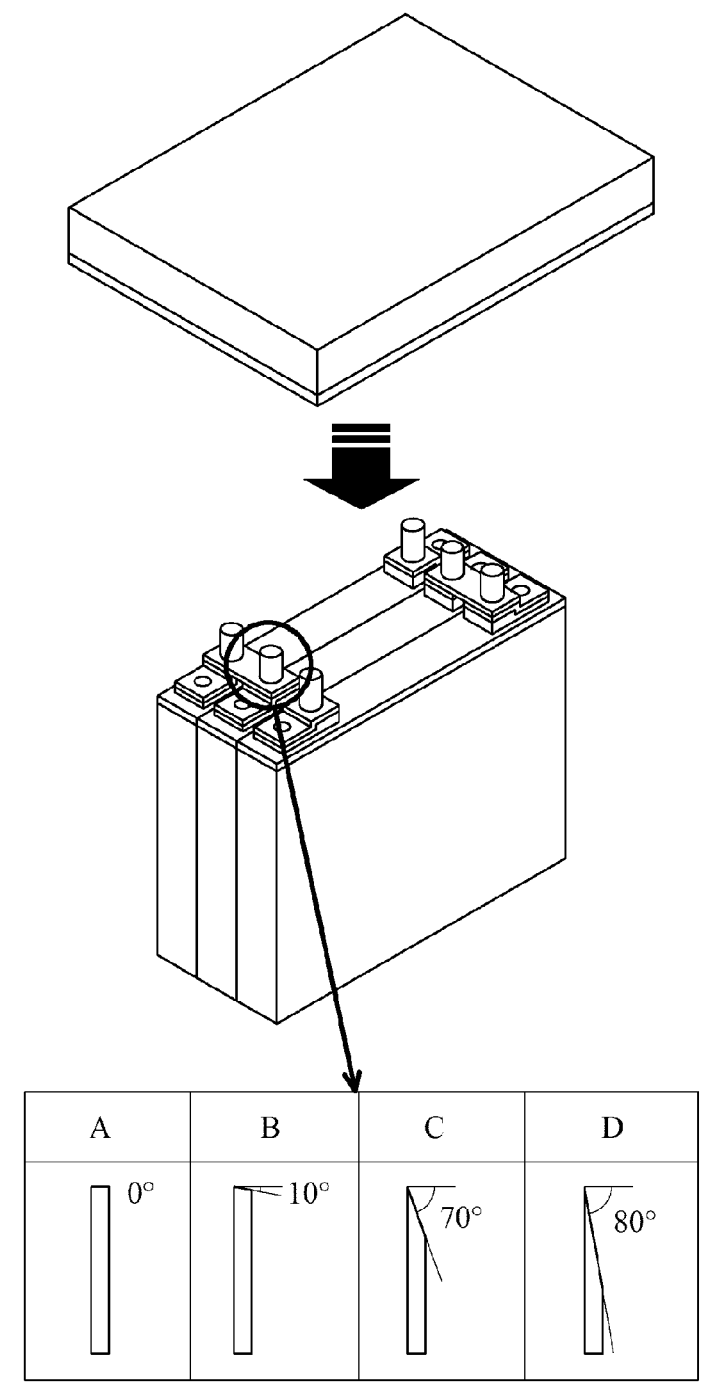
FIG. 7 is a diagram showing a crush test of the battery module.

As shown in FIG. 7, a plurality of kinds of battery modules (battery modules A to D) in each of which three batteries were connected in series by using bus bars were prepared and rates of occurrence of short circuits when a force was applied to external terminals from above were evaluated. In this test, a crushing bar formed by attaching an insulating member to a lower face of a flat plate made of SUS304 was used, the crushing bar was dropped at 10 mm/sec onto an upper face of each of the battery modules, and pressing was continued until the external terminals were deformed (fall over). The crush of the external terminals with the crushing bar was carried out five times and the number of short circuits of the central battery cell was counted.

The battery modules A to D were substantially the same in structure but different in that angles of slopes of tip end faces of the external terminals were 0°, 10°, 70°, and 80°. The battery modules A to D had notches in the external terminals above the bus bars.

Table 1 shows results of the crush tests.

TABLE 1

| Battery Module | A | B | C | D |
|---|---|---|---|---|
| Angle of Tip End Face | 0° | 10° | 70° | 80° |
| Short Circuits/Tests | 3/5 | 0/5 | 0/5 | 3/5 |

In the battery modules B and C in which the respective angles of the slopes of the tip end faces were 10° and 70°, the short circuit did not occur. In the battery module A in which the tip end faces were flat faces (0°) and the battery module D in which the angles of the slopes of the tip end faces were 80°, the short circuits occurred at the same rate. From the results of the crush test, the angle of the slope of the tip end face of the external terminal was found to be preferably in a range of 10° to 70°.

INDUSTRIAL APPLICABILITY

The invention can be applied to a technique of preventing contact between an external terminal and a main body in a battery having the external terminal provided to protrude outward from a face of the main body.

DESCRIPTION OF NUMERALS

1: battery, 2: main body, 10: external terminal, 11: tip end face, 12: notch, 20: metal terminal, 30: insulating member

The invention claimed is:

1. A battery comprising:
    an external terminal protruding outward from a main body;
    a metal terminal for taking out electric power from an inside of the main body to the external terminal; and
    an insulating member for insulation between the main body, and the external terminal and the metal terminal, wherein
    the metal terminal comprises: a base portion connected to the inside of the main body and extending along a same plane as one face of the main body from which the external terminal protrudes; and an end portion further extending from the base portion and to which the external terminal is fixed, and
    the external terminal comprises a tip end face formed as a sloping face inclined in a direction from the end portion towards the base portion such that a deformation direction of the external terminal is restricted when an external force is applied to the tip end face.

2. The battery according to claim 1, wherein the external terminal comprises a notch at a midpoint in a protruding direction thereof.

3. The battery according to claim 1, wherein a slope angle of the tip end face of the external terminal is set in a range of 10° to 70°.

4. A battery module configured by connecting a plurality of the batteries according to claim 1,
    wherein the external terminals of the adjacent batteries are connected by a bus bar.

5. The battery module according to claim 4, wherein each of the external terminals comprises a notch at a midpoint in a protruding direction thereof, wherein the notch is formed above a portion connected to the bus bar.

* * * * *